(12) United States Patent
Xiong et al.

(10) Patent No.: US 10,103,538 B1
(45) Date of Patent: Oct. 16, 2018

(54) SURGE PROTECTION CIRCUIT FOR A HALF-BRIDGE POWER CONVERTER

(71) Applicant: Universal Lighting Technologies, Inc., Madison, AL (US)

(72) Inventors: Wei Xiong, Madison, AL (US); Rohan Dayal, Madison, AL (US); Scott Price, Madison, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 1063 days.

(21) Appl. No.: 14/491,046

(22) Filed: Sep. 19, 2014

Related U.S. Application Data

(60) Provisional application No. 61/886,880, filed on Oct. 4, 2013.

(51) Int. Cl.
| | |
|---|---|
| *H02H 3/20* | (2006.01) |
| *H02H 9/04* | (2006.01) |
| *H02H 7/122* | (2006.01) |
| *H02M 7/5387* | (2007.01) |
| *H02M 5/458* | (2006.01) |
| *H05B 37/02* | (2006.01) |

(52) U.S. Cl.
CPC .............. *H02H 7/122* (2013.01); *H02H 3/20* (2013.01); *H02M 5/4585* (2013.01); *H02M 7/53871* (2013.01); *H05B 37/0227* (2013.01)

(58) Field of Classification Search
CPC ............. H02H 3/20; H02H 9/04; H02H 9/041
USPC ......................................................... 361/91.1
See application file for complete search history.

(56) References Cited

U.S. PATENT DOCUMENTS

2014/0070743 A1* 3/2014 Yoshida ................ H02P 29/024
318/400.22

* cited by examiner

*Primary Examiner* — Dharti Patel
(74) *Attorney, Agent, or Firm* — Patterson Intellectual Property Law, P.C.; Gary L. Montle

(57) ABSTRACT

A driver circuit provides power from a power source to a load. The driver circuit includes a surge protector, an input stage (e.g., full wave rectifier), a controller, an overvoltage protection circuit, and an output stage (e.g., a half bridge inverter). The input stage receives power from the power source and provides a direct current (DC) power rail. The controller operates the output stage to provide power from the DC power rail to the load. The overvoltage protection circuit shuts down the controller when the DC power rail exceeds a predetermined voltage. This ceases operation of the output stage, protecting the output stage from damage while the DC power rail is above the predetermined voltage.

18 Claims, 2 Drawing Sheets

10,103,538 B1

SURGE PROTECTION CIRCUIT FOR A HALF-BRIDGE POWER CONVERTER

CROSS-REFERENCES TO RELATED APPLICATIONS

This application claims priority to and hereby incorporates by reference in its entirety U.S. Provisional Patent Application No. 61/886,880 entitled "SURGE PROTECTION CIRCUIT FOR A HALF-BRIDGE POWER CONVERTER" filed on Oct. 4, 2013.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to protecting driver circuits and ballasts from input power surges. More particularly, this invention pertains to protecting driver circuit and ballast inverters during an input power surge.

Lightning causes high-voltage surges in power supplies to electronics. To meet the standard for outdoor surge protection, a circuit must survive a 6 KV surge combo-wave. Referring to prior art FIG. 1, most driver circuits or ballasts include a half bridge based inverter or converter. The driver circuit 100 receives power from a power supply 102 and provides power to a load 104. The driver circuit 100 includes an input stage 116, a surge protector 114, a voltage regulator 108, a controller 106, and an output stage 118. The surge protector 114 limits the voltage from the power source 102 to the input stage 116. The input stage 116 includes a full wave rectifier, and a smoothing capacitor C1. Four diodes (i.e., diodes D1-D4) form a full wave rectifier operable to receive alternating current (AC) power from the power supply 102 and provide a direct current (DC) power rail 112. The smoothing capacitor C1 is an electrolytic capacitor the buffers the DC power rail. The voltage regulator 108 and a second capacitor C2 provide a bias voltage VCC to the controller 106. The output stage 118 is a half bridge inverter including a first switch Q1 and a second switch Q2. The controller 106 drives the first switch Q1 and the second switch Q2 such that the output stage 118 provides AC power to the load 104 from the DC power rail 112. The controller 106 provides drive signals to the first switch Q1 and the second switch Q2 so long as the controller 106 is receiving the bias voltage VCC from the oldest regulator 108 and a disable pin of the controller 106 is receiving the bias voltage VCC (i.e., not grounded).

When a high-voltage surge appears at the power source 102, even with the surge protector 114, high-voltage is created across the smoothing capacitor C1 (i.e., at the DC power rail 112). Without any further protection, the first switch Q1 and the second switch Q2 will not survive the surge because the first switch Q1 and the second switch Q2 are designed to meet the steady-state voltage requirement. That is, if the DC power rail operates at approximately 470 V DC, a 600 V rated first switch Q1 and second switch Q2 will be used. If the DC power rail 112 exceeds 600 V during the surge (which frequently happens), the voltage rating of the first switch Q1 and the second switch Q2 will be exceeded, causing failure of the output stage 118 and thus the driver circuit 100.

BRIEF SUMMARY OF THE INVENTION

Aspects of the present invention provide a driver circuit that provides power from a power source to a load. The driver circuit includes a surge protector, an input stage (e.g., full wave rectifier), a controller, on overvoltage protection circuit, and an output stage (e.g., a half bridge inverter). The input stage receives power from the power source and provides a direct current (DC) power rail. The controller operates the output stage to provide power from the DC power rail to the load. The overvoltage protection circuit shuts down the controller when the DC power rail exceeds a predetermined voltage. This ceases operation of the output stage, protecting the output stage from damage while the DC power rail is above the predetermined voltage.

In one aspect, a driver circuit operable to provide power from a power source to a load includes an input stage, a surge protector, and output stage, a controller, and an overvoltage protection circuit. The input stage is operable to receive power from the power source and provide a DC power rail. The voltage of the DC power rail is substantially proportional to a voltage of the power source. The surge protector is operable to limit the voltage of the power received at the input stage from the power source. The output stage is operable to receive power from the DC power rail and provide an output power to the load when operating. The output stage includes an inverter. The controller is operable to operate the output stage when enabled. The overvoltage protection circuit is operable to determine a voltage of the DC power rail, enable the controller, and selectively disable the controller when the determined voltage of the DC power rail exceeds a predetermined threshold.

In another aspect, a light fixture is operable to provide light in response to receiving power from a power source. A driver circuit operable to provide power from a power source to a load includes an input stage, a surge protector, and output stage, a controller, and an overvoltage protection circuit. The input stage is operable to receive power from the power source and provide a DC power rail. The voltage of the DC power rail is substantially proportional to a voltage of the power source. The surge protector is operable to limit the voltage of the power received at the input stage from the power source. The output stage is operable to receive power from the DC power rail and provide an output power to the load when operating. The output stage includes an inverter. The controller is operable to operate the output stage when enabled. The overvoltage protection circuit is operable to determine a voltage of the DC power rail, enable the controller, and selectively disable the controller when the determined voltage of the DC power rail exceeds a predetermined threshold.

BRIEF DESCRIPTION OF THE SEVERAL VIEWS OF THE DRAWINGS

Reference will now be made in detail to optional embodiments of the invention, examples of which are illustrated in accompanying drawings. Whenever possible, the same reference numbers are used in the drawing and in the description referring to the same or like parts.

DETAILED DESCRIPTION OF THE INVENTION

Figure 1:
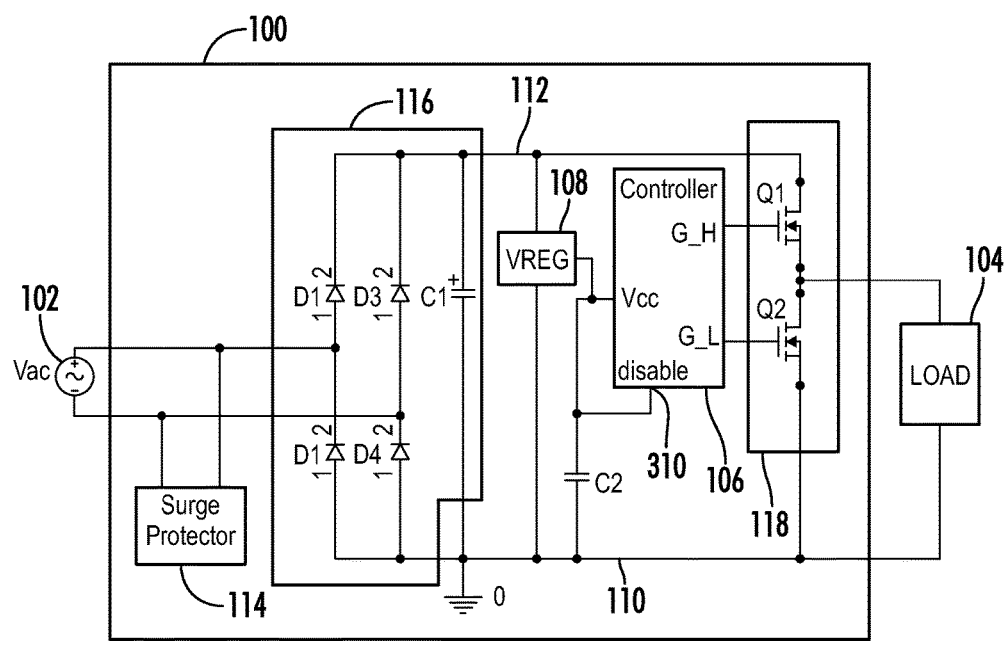
FIG. 1 is a block and partial schematic diagram of a prior art driver circuit.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

The phrase "in one embodiment," as used herein does not necessarily refer to the same embodiment, although it may. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The terms "coupled" and "connected" mean at least either a direct electrical connection between the connected items or an indirect connection through one or more passive or active intermediary devices.

The term "circuit" means at least either a single component or a multiplicity of components, either active and/or passive, that are coupled together to provide a desired function.

The terms "switching element" and "switch" may be used interchangeably and may refer herein to at least: a variety of transistors as known in the art (including but not limited to FET, BJT, IGBT, JFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

The terms "power converter" and "converter" unless otherwise defined with respect to a particular element may be used interchangeably herein and with reference to at least DC-DC, DC-AC, AC-DC, buck, buck-boost, boost, half-bridge, full-bridge, H-bridge or various other forms of power conversion or inversion as known to one of skill in the art.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

As used herein, "ballast" and "driver circuit" refer to any circuit for providing power (e.g., current) from a power source to a light source. Additionally, "light source" refers to one or more light emitting devices such as fluorescent lamps, high intensity discharge lamps, incandescent bulbs, and solid state light-emitting elements such as light emitting diodes (LEDs), organic light emitting diodes (OLEDs), and plasmaloids. Further, "connected between" or "connected to" means electrically connected when referring to electrical devices in circuit schematics or diagrams.

Figure 2:
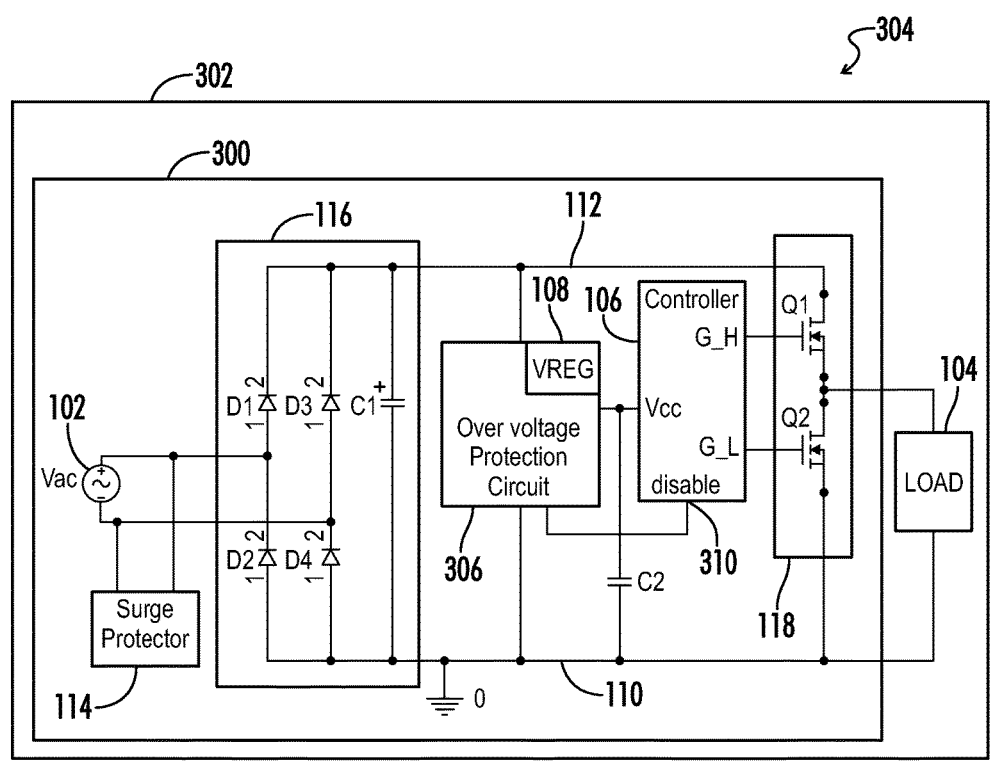
FIG. 2 is a block and partial schematic diagram of a light fixture including a driver circuit having an overvoltage protection circuit.

Referring to FIG. 2, a light fixture 304 is operable to provide light in response to receiving power from the power source 102. The light fixture 304 includes a light source 104, a driver circuit 300, and a housing 302. The light source 104 is operable to provide light in response to receiving power. In one embodiment, the light source 104 includes a plurality of light emitting diodes. In another embodiment, the light source 104 includes a fluorescent lamp. The housing 302 is configured to support the light source 104 and the driver circuit 300.

The driver circuit 300 is operable to provide power from the power source 102 to the light source 104. The driver circuit 300 includes the input stage 118, the surge protector 114, the output stage 118, the controller 106, and an overvoltage protection circuit 306. The surge protector 114 is operable to limit the voltage of the power received at the input stage 118 from the power source 102. It is contemplated that the surge protector 114 may be integral with the input stage 116 or physically separate from the driver circuit 300 within the scope of the claims.

The input stage 118 is operable to receive power from the power source 102 and provide the DC power rail 112. The voltage of the DC power rail substantially proportional to the voltage of the power source 102. In one embodiment, the power source 102 is an AC power source, and the input stage 118 includes a full wave rectifier such that the voltage of the AC power source 102, as limited by the surge protector 114, passes through the full wave rectifier to the overvoltage protection circuit 306 and the output stage 118. In one embodiment, the voltage of the DC power rail 112 is approximately 470 volts DC.

The output stage 118 is operable to receive power from the DC power rail 112 and provide output power to the light source 104 when operating. The output stage 118 includes an inverter. In one embodiment, the inverter is a half bridge inverter including a pair of switches (i.e., a first switch Q1 and a second switch Q2). Each switch of the pair of switches has a rated voltage. In one embodiment, each switch is rated at approximately 600 volts.

The controller 106 is operable to operate the output stage 118 when enabled. That is, the controller 106 provides drive signals to the first switch Q1 and the second switch Q2 of the output stage 118. In one embodiment, the controller 106 provides pulse width modulated drive signals as a function of an output current of the output power provided to the load 104 by the output stage 118.

In one embodiment, the driver circuit 300 further includes the voltage regulator 108. The voltage regulator is operable to receive power form the DC power rail 112 and provide the bias voltage VCC to the controller 106. In one embodiment, the overvoltage protection circuit 306 is integral with the voltage regulator 108. In another embodiment, the voltage regulator 108 is separate from the overvoltage protection circuit 306 and is electrically positioned between the overvoltage protection circuit 306 and the controller 106 such that the controller 106 is connected to the DC power rail 112 via the voltage regulator 108 and the overvoltage protection circuit 306. In yet another embodiment, the voltage regulator 108 is internal to the controller 106 such that the overvoltage protection circuit 106 provides the voltage of the DC power rail 112 directly to the controller 106.

The overvoltage protection circuit 306 is operable to determine the voltage of the DC power rail 112, enable the controller 106, and selectively disable the controller 106 when the determined voltage of the DC power rail 112 exceeds a predetermined threshold. In one embodiment, the predetermined threshold is approximately equal to the rated voltage of the first switch Q1 and the second switch Q2. In one embodiment, the overvoltage protection circuit 306 is configured to disable the controller 106 by preventing the controller 106 from receiving power from the DC power rail 112. The controller 106 prevents the controller 106 from receiving power from the DC power rail 112 by preventing the voltage regulator 108 from receiving power form the DC power rail 112. In another embodiment, the overvoltage protection circuit 306 disables the controller 106 by shorting (i.e., connecting) the bias voltage pin VCC of the controller 106 to circuit ground 110 to pull down the bias voltage VCC of the controller. In another embodiment, the overvoltage protection circuit 306 disables the controller 106 by actuating a disable terminal 310 of the controller 106. In one embodiment, the overvoltage protection circuit 306 actuates the disable terminal 310 of the controller 106 by grounding the disable terminal 310 of the controller 106. When both the first switch Q1 and the second switch Q2 are off, the output stage 118 (e.g., half bridge inverter) can survive twice the rated voltage of the first and second switches Q1, Q2. That is, for 600 volt rated switches, the output stage 118 can survive 1200 volts (i.e., function properly after the power surge). For a 470 volt DC power rail 112, a surge voltage will commonly exceed 600 volts (i.e., the rated voltage of one switch of the output stage 118), but the surge protector 114 will generally limit the voltage of the DC power rail 112 to less than the 1200 volt capacity of the output stage 118 when the output stage 118 has been shut down (e.g., when the controller 106 is shut down and no longer providing drive signals to the first and second switches Q1, Q2). When the voltage of the DC power rail 112 falls below the predetermined threshold, the overvoltage protection circuit 306 enables the controller 106, resuming operation of the driver circuit 116 and power to the load 104.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although embodiments of the present invention have been described in detail, it will be understood by those skilled in the art that various modifications can be made therein without departing from the spirit and scope of the invention as set forth in the appended claims.

A controller, processor, computing device, client computing device or computer, such as described herein, includes at least one or more processors or processing units and a system memory. The controller may also include at least some form of computer readable media. By way of example and not limitation, computer readable media may include computer storage media and communication media. Computer readable storage media may include volatile and nonvolatile, removable and non-removable media implemented in any method or technology that enables storage of information, such as computer readable instructions, data structures, program modules, or other data. Communication media may embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media. As used herein, server is not intended to refer to a single computer or computing device. In implementation, a server will generally include an edge server, a plurality of data servers, a storage database (e.g., a large scale RAID array), and various networking components. It is contemplated that these devices or functions may also be implemented in virtual machines and spread across multiple physical computing devices.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention of a new and useful SURGE PROTECTION CIRCUIT FOR A HALF-BRIDGE POWER CONVERTER it is not intended that such references be construed as limitations upon the scope of this invention except as set forth in the following claims.

What is claimed is:

1. A light fixture operable to provide light in response to receiving power from a power source, said light fixture comprising:
   a light source operable to provide light in response to receiving power;
   a driver circuit operable to provide power from the power source to the light source, said driver circuit comprising:
      an input stage operable to receive power from the power source and provide a direct current (DC) power rail, wherein a voltage of the DC power rail is substantially proportional to a voltage of the power source;
      a surge protector operable to limit the voltage of power received from the power source at the input stage;
      an output stage operable to receive power from the DC power rail and provide output power to the light source when operating, wherein the output stage comprises a half bridge inverter comprising a pair of switches, wherein a switch of the pair of switches has a rated voltage;
      a voltage regulator operable to receive power from the DC power rail and provide a bias voltage to a controller operable to operate the output stage when enabled, wherein the controller is connected to the DC power rail via the voltage regulator and the overvoltage protection circuit; and
      an overvoltage protection circuit operable to determine the voltage of the DC power rail, enable the controller, and selectively disable the controller when the determined voltage of the DC power rail exceeds a predetermined threshold that is approximately the rated voltage, wherein the overvoltage protection circuit is configured to disable the controller by preventing the voltage regulator from receiving power from the DC power rail,
      further wherein the pair of switches are opened throughout an input surge condition corresponding to the determined DC power rail voltage exceeding the predetermined threshold; and
   a housing configured to support the light source and the driver circuit.

2. The light fixture of claim 1, wherein:
   the power source is an AC power source; and
   the input stage comprises a full wave rectifier such that the voltage of the AC power source, as limited by the surge protector, passes through the full wave rectifier to the overvoltage protection circuit and the output stage.

3. The light fixture of claim 1, wherein the overvoltage protection circuit disables the controller by actuating a disable terminal of the controller.

4. The light fixture of claim 1, wherein the overvoltage protection circuit disables the controller by grounding a disable terminal of the controller.

5. The light fixture of claim 1, wherein the light source is a fluorescent lamp.

6. The light fixture of claim 1, wherein the light source comprises a light emitting diode.

7. A light fixture operable to provide light in response to receiving power from a power source, said light fixture comprising:
   a light source operable to provide light in response to receiving power;
   a driver circuit operable to provide power from the power source to the light source, said driver circuit comprising:
      an input stage operable to receive power from the power source and provide a direct current (DC) power rail, wherein a voltage of the DC power rail is substantially proportional to a voltage of the power source;
      a surge protector operable to limit the voltage of power received from the power source at the input stage;
      an output stage operable to receive power from the DC power rail and provide output power to the light source when operating, wherein the output stage comprises a half bridge inverter comprising a pair of switches, wherein a switch of the pair of switches has a rated voltage;
      a voltage regulator operable to receive power from the DC power rail and provide a bias voltage to a controller operable to operate the output stage when enabled, wherein the voltage regulator is internal to the controller; and
      an overvoltage protection circuit operable to determine the voltage of the DC power rail, enable the controller, and selectively disable the controller when the determined voltage of the DC power rail exceeds a predetermined threshold that is approximately the rated voltage, wherein the overvoltage protection circuit is configured to disable the controller by preventing the voltage regulator from receiving power from the DC power rail;
      further wherein the pair of switches are opened throughout an input surge condition corresponding to the determined DC power rail voltage exceeding the predetermined threshold; and
   a housing configured to support the light source and the driver circuit.

8. The light fixture of claim 7, wherein:
   the power source is an AC power source; and
   the input stage comprises a full wave rectifier such that the voltage of the AC power source, as limited by the surge protector, passes through the full wave rectifier to the overvoltage protection circuit and the output stage.

9. The light fixture of claim 7, wherein the overvoltage protection circuit further disables the controller by actuating a disable terminal of the controller.

10. The light fixture of claim 7, wherein the overvoltage protection circuit further disables the controller by grounding a disable terminal of the controller.

11. The light fixture of claim 7, wherein the light source is a fluorescent lamp.

12. The light fixture of claim 7, wherein the light source comprises a light emitting diode.

13. A light fixture operable to provide light in response to receiving power from a power source, said light fixture comprising:
- a light source operable to provide light in response to receiving power;
- a driver circuit operable to provide power from the power source to the light source, said driver circuit comprising:
  - an input stage operable to receive power from the power source and provide a direct current (DC) power rail, wherein a voltage of the DC power rail is substantially proportional to a voltage of the power source;
  - a surge protector operable to limit the voltage of power received from the power source at the input stage;
  - an output stage operable to receive power from the DC power rail and provide output power to the light source when operating, wherein the output stage comprises a half bridge inverter comprising a pair of switches, wherein a switch of the pair of switches has a rated voltage;
  - a voltage regulator operable to receive power from the DC power rail and provide a bias voltage to a controller operable to operate the output stage when enabled; and
  - an overvoltage protection circuit operable to determine the voltage of the DC power rail, enable the controller, and selectively disable the controller when the determined voltage of the DC power rail exceeds a predetermined threshold that is approximately the rated voltage, wherein the overvoltage protection circuit is configured to disable the controller by preventing the voltage regulator from receiving power from the DC power rail, wherein the voltage regulator is internal to the overvoltage protection circuit;
  - further wherein the pair of switches are opened throughout an input surge condition corresponding to the determined DC power rail voltage exceeding the predetermined threshold; and
- a housing configured to support the light source and the driver circuit.

14. The light fixture of claim 13, wherein:
the power source is an AC power source; and
the input stage comprises a full wave rectifier such that the voltage of the AC power source, as limited by the surge protector, passes through the full wave rectifier to the overvoltage protection circuit and the output stage.

15. The light fixture of claim 13, wherein the overvoltage protection circuit further disables the controller by actuating a disable terminal of the controller.

16. The light fixture of claim 13, wherein the overvoltage protection circuit further disables the controller by grounding a disable terminal of the controller.

17. The light fixture of claim 13, wherein the light source is a fluorescent lamp.

18. The light fixture of claim 13, wherein the light source comprises a light emitting diode.

* * * * *